United States Patent [19]

Kazaoka et al.

[11] Patent Number: 4,687,251
[45] Date of Patent: Aug. 18, 1987

[54] SEAT CUSHION FOR VEHICLES

[75] Inventors: Kenichi Kazaoka, Nagoya; Hiroshi Okazaki, Toyota; Yasuhisa Inaba, Handa, all of Japan

[73] Assignee: Aisin Seiki Kabushiki Kaisha, Japan

[21] Appl. No.: 746,865

[22] Filed: Jun. 20, 1985

[30] Foreign Application Priority Data

Jun. 22, 1984 [JP] Japan ................. 59-127605

[51] Int. Cl.⁴ .................. A47C 1/022; B60N 1/02
[52] U.S. Cl. .................... 297/337; 248/397; 248/419; 297/339; 297/346
[58] Field of Search .............. 297/321, 322, 337, 338, 297/339, 346, 374; 248/393, 394, 396, 397, 419, 424, 429

[56] References Cited

U.S. PATENT DOCUMENTS

| 2,624,396 | 1/1953 | Spraragen | 297/374 |
|---|---|---|---|
| 3,109,622 | 11/1963 | Heyl, Jr. | 248/420 |
| 3,235,308 | 2/1966 | Conner | 297/337 |
| 3,269,687 | 8/1966 | Pickles | 248/419 X |
| 3,562,851 | 2/1971 | Koller | 297/374 X |
| 4,339,103 | 7/1982 | Mori et al. | 248/397 |
| 4,533,027 | 8/1985 | Otani et al. | 248/394 X |

FOREIGN PATENT DOCUMENTS

| 3315233 | 12/1983 | Fed. Rep. of Germany | 297/339 |
|---|---|---|---|
| 59-77930 | 4/1984 | Japan . | |
| 1011446 | 12/1965 | United Kingdom | 297/374 |

Primary Examiner—Kenneth J. Dorner
Assistant Examiner—Peter R. Brown
Attorney, Agent, or Firm—Finnegan, Henderson, Farabow, Garrett & Dunner

[57] ABSTRACT

A seat cushion for a vehicle seat includes a moving device one end thereof being connected to the vehicle floor and the other end connected to the seat cushion for moving the cushion forwardly and rearwardly relative to a seat back and an operating lever for actuating the moving device and a two-way clutch for transmitting output from the operating lever to the moving device.

8 Claims, 7 Drawing Figures

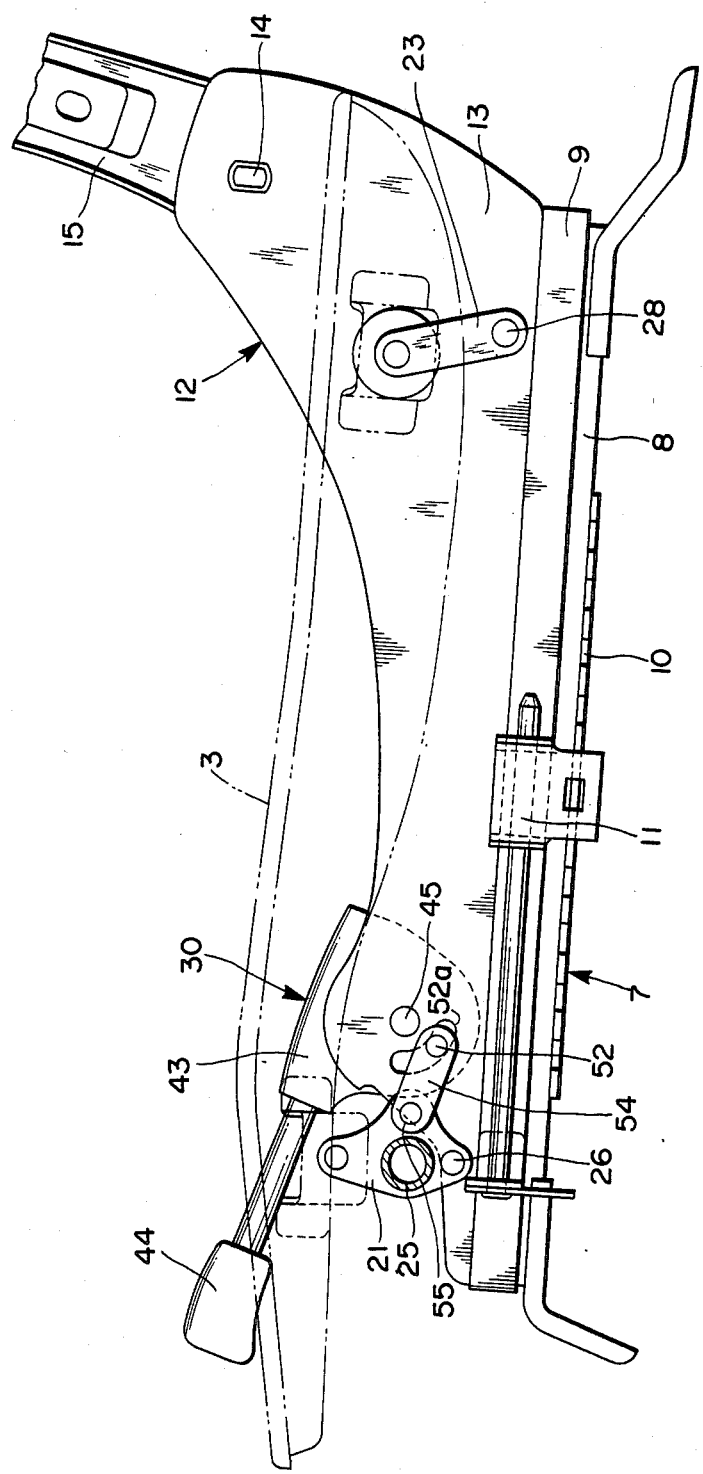

SEAT CUSHION FOR VEHICLES

BACKGROUND OF THE INVENTION

1. Field of the Invention

This invention relates to a seat cushion and more particularly to a seat cushion for vehicles.

2. Description of Prior Art

Generally, a seat assembly for a vehicle such as an automobile includes a seat cushion part which receives weight of an occupant of the seat and a seat back part which supports the back of the occupant therein. The reclining angle of the seat back can be adjustable by providing a seat reclining mechanism for changing the angle of the seat back relative to the seat cushion. However, there have not been developed any devices which can move the seat cushion part back and forth relative to the seat back part of the seat assembly.

In a present type seat assembly, the depth of the seat cushion part relative to the seat back part is determined by assuming a standard height of an occupant of the seat. For example, the depth of the seat cushion (the length from the front end to the rear end of the cushion) is determined by the height of the occupant whose height is an average. Thus, if a person whose height is average occupies the seat, he is able to operate steering wheel and pedals comfortably. However, if the occupant of the seat is shorter or taller than the predetermined average height, the length of the seat cushion may be too long or too short. It is desirable to assure any occupant of the seat of the comfortable seating as well as the easy operation of the pedals and steering wheel.

SUMMARY OF THE INVENTION

It is, therefore, an object of the present invention to provide an improved seat assembly which includes a mechanism which enables the seat cushion part of the assembly to move back and forth relative to the seat back so that anyone may sit in the assembly and operate the vehicle comfortably.

It is another object of the invention to provide a seat assembly which includes a moving means between vehicle floor and the seat cushion wherein the moving means is operable through two-way clutch.

BRIEF DESCRIPTION OF THE DRAWINGS

These and other features of the invention will be more apparent from the following description of the invention with the accompanying drawings:

FIG. 2 is a side view of FIG. 1;

DETAIL EXPLANATION OF THE PREFERRED EMBODIMENTS

Figure 1:
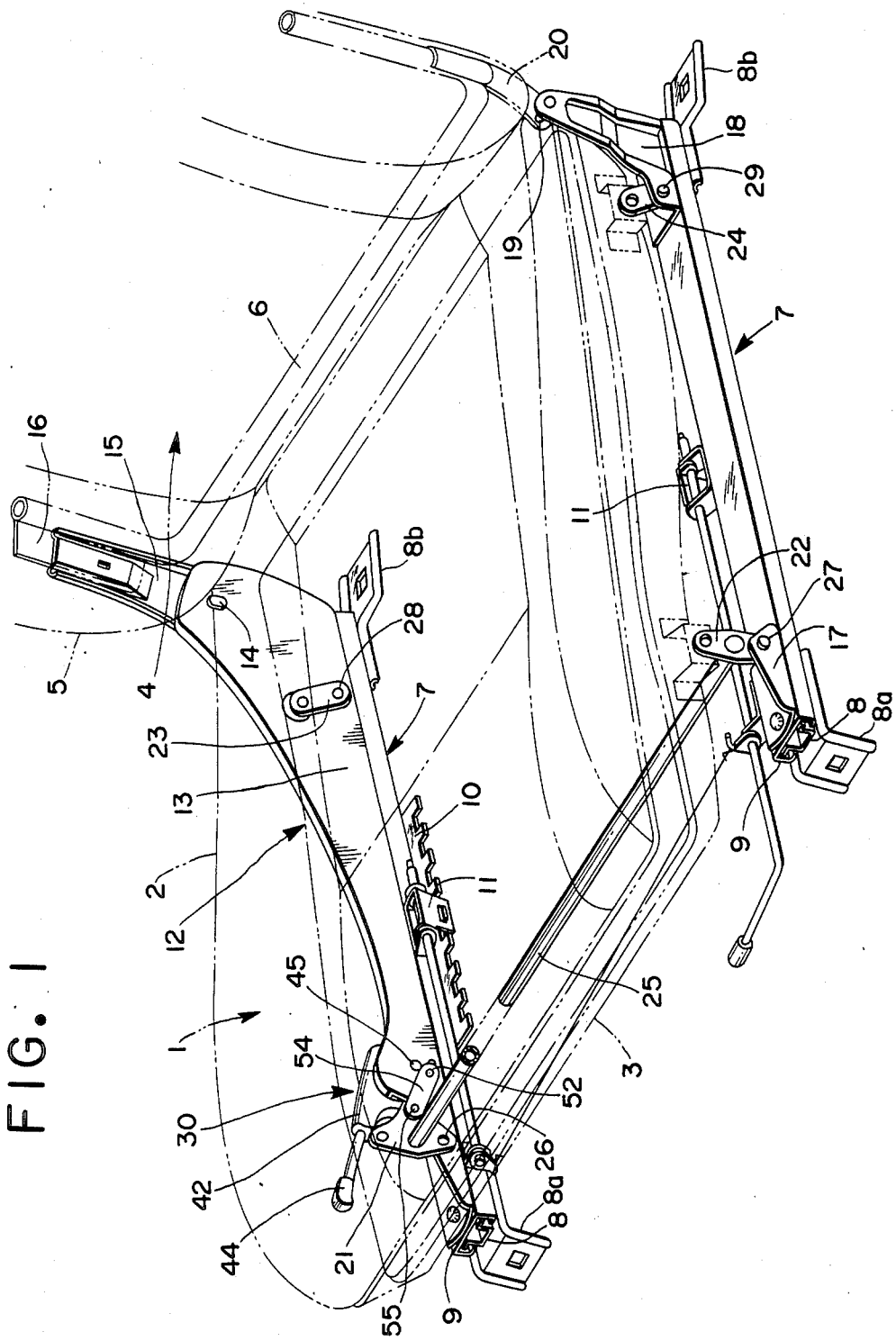
FIG. 1 is a perspective view of the seat assembly according to an embodiment of the invention.
Figure 4:
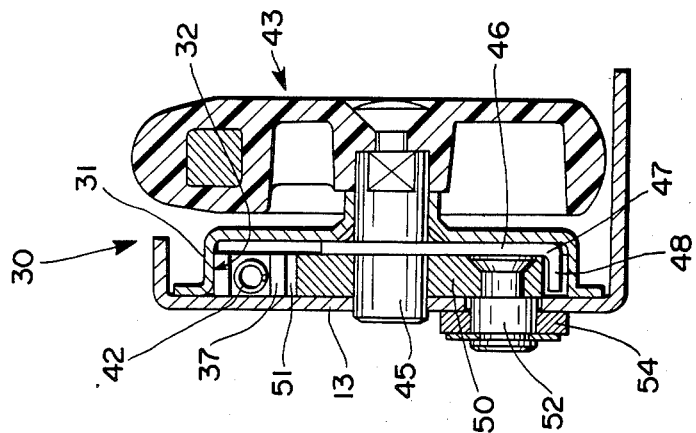
FIG. 4 shows a cross-sectional view taken along the line A—A in FIG. 3.
Figure 3:
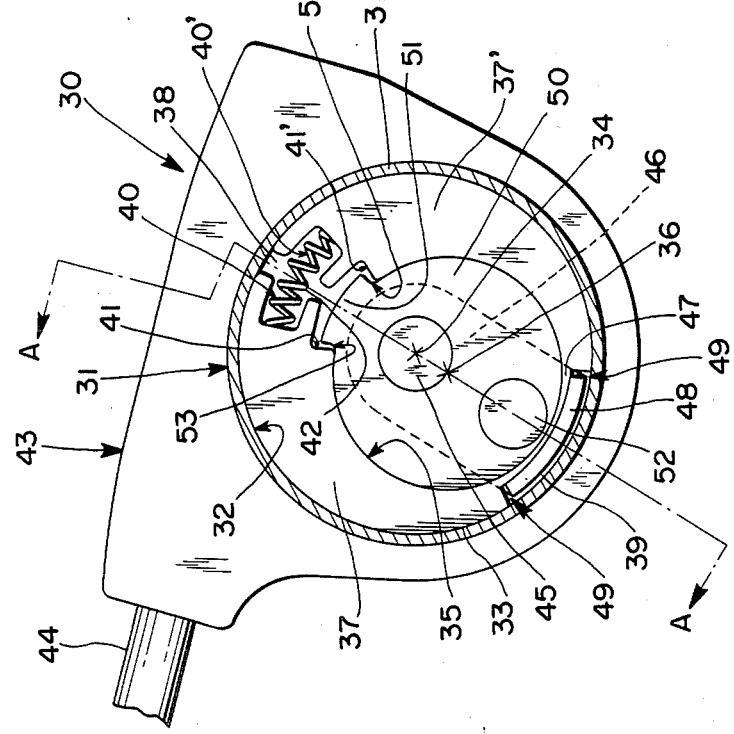
FIG. 3 shows a side view of a clutch 30 of FIG. 2.

Referring particularly to FIGS. 1–4, numeral 1 designates a seat cushion which includes a cushion pad 2 covered with a decorative material and a cushion pan 3 for receiving therein the pad 2. Numeral 4 indicates a seat back having a cushion pad 5 and pipe frame 6 for supporting the pad 5 thereon. Seat slide adjuster 7 for slidably moving the seat assembly back and forth relative to the vehicle floor (not shown). The seat slide adjuster 7 includes a pair of lower rails 8, 8 secured to the floor and through forward and rearward brackets 8a, 8b a pair of upper rails 9, 9 slidably engaged with the lower rails 8, 8. A latch plate 10 is provided on the lower rails 8, 8 and a stopper 11 is provided on the upper rails 9, 9 and is engageable with one of the latches provided on the latch plate 10 to form a locking device for stopping the relative movement between the upper and lower rails. Numeral 12 designates a seat reclining adjuster for reclining the position of the seat back 6 relative to the position of seat cushion 1. The seat reclining adjuster 12 includes a lower hinge plate 13 secured to one of the upper rails 9, 9 of the seat slide adjuster 7 hinge shaft 14, and an upper hinge plate 15 secured to a seat back plate 16 which is secured to a pipe frame 6 for supporting the seat back thereon. A bracket 17 is secured to a front end of one of the upper rails 9, 9 and a hinge plate 18 is secured to a rear end of the upper rail 9. The hinge plate 18 includes a hinge pin 19 secured to the upper portion thereof for pivotal movement with a plate 20 secured to the seat back pipe 6. Numerals 21, 22, 23 and 24 designate link members for moving the seat cushion 1 back and forth. Link members 21 and 22 are connected to each other by a pipe 25 provided transversary through the seat cushion. The lower end of the link member 21 is pivoted to the front end of the lower hinge plate 13 through a hinge pin 26, while the link member 22 is pivoted to the bracket 17 through pin 27. Link members 23 and 24 are pivoted to the rear end of the lower hinge plate 13 and lower end of the hinge plate 18 through pins 28 and 29, respectively. The upper portions of the link members 21–24 are attached to the cushion pan 3. Numeral 30 indicates a clutch mechanism provided in a case 31 secured to the lower hinge plate 13 (FIG. 3 or 4). A pair of locking plates 37, 37' are provided in the inner surface 32 of the case 31. The outer peripheries 33 of the plates 37, 37' are co-central with the center 34 of the case 31 and the inner peripheries of the locking plate 37, 37' are co-central with an eccentric center 36 of the case 31. A pair of gaps or spaces 38 and 39 is provided between the locking plates 37, 37' when they are disposed in the case 31 (clearly shown in FIG. 3). The gap 38 includes a pair of concave portions 40, 40' and a pair of engaging portions 41, 41'. A spring 42 is disposed between the concave portions 40, 40'. An operating lever 43 is secured to a shaft 45 and includes a knob portion 45 at the outer end thereof. The shaft 45 is pivoted to the case 31 and lower hinge plate 13. A release lever 46 is secured to the shaft 45 and includes a L-shaped bent portion 48 at one end 47 thereof. The bent portion 48 is disposed in the gap 39 leaving small gaps between the bent portion and the locking plates 37, 37', respectively. Output side disc plate 50 is rotatably supported on the shaft 45 and is disposed between the locking plates 37, 37' having the center 36 which is identical with the eccentric center 36 of the case 31. The disc 50 is slidably disposed in the inner peripheral surface 35 formed by the plates 37, 37'. The disc 50 further includes a projection 51 between the engaging portions 41, 41' of the locking plates 37, 37' leaving small gaps 53 therebetween and a pin 52 opposite to the center 34 of the case 31. A connecting link 54 is pivoted to the pin 52 and the link member 21 through pin 55 (FIG. 1 or 2). When an occupant of the seat wants to lengthen the seat cushion, he or she pulls the operating lever 44 upwardly as shown in FIG. 2 to rotate the shaft in clockwise direction in FIG. 3. Due to the rotation of the shaft 45, the release lever 46 secured to the shaft is also rotated to be in contact with one end of the locking plate 37 at the bent portion 48 thereby to rotate the plate 37 in the same direction (clockwise direction in FIG. 3). As a result, the engaging portion 41 of the plate 37 is brought into engagement with the one side of the projection 51 of the disc 50. Then the disc 50 is rotated in the clockwise direction to thereby move the connecting link 54 to the left (in FIGS. 2 or 3) through pin 52. Due to the leftward movement of the link 54, the link member 21 is rotated about the pin 26 in counterclockwise direction (in FIGS. 1 or 2). As shown in FIG. 2, the hinge plate 13 may include a guide groove 52a for slidably receiving the pin 52 during rotation of the disc 50. In cooperation with the other link members 22, 23 and 24, the seat cushion 1 disposed in the pan 3, is moved forwardly with respect to the seat back 4. After the lever 44 being released, locking plates 37, 37' of the clutch mechanism are moved by the force of the spring 42 disposed therebetween and the inner surfaces thereof become strong contact with the outer peripheral surface of the disc 50 and outer surfaces thereof become strong contact with the inner peripheral surface 32 of the case 31. Thus, even if the disc 50 is rotated in either direction, through connecting link 54, a wedge effect will stop the rotation thereof to completely lock the rotational movement.

Figure 5:
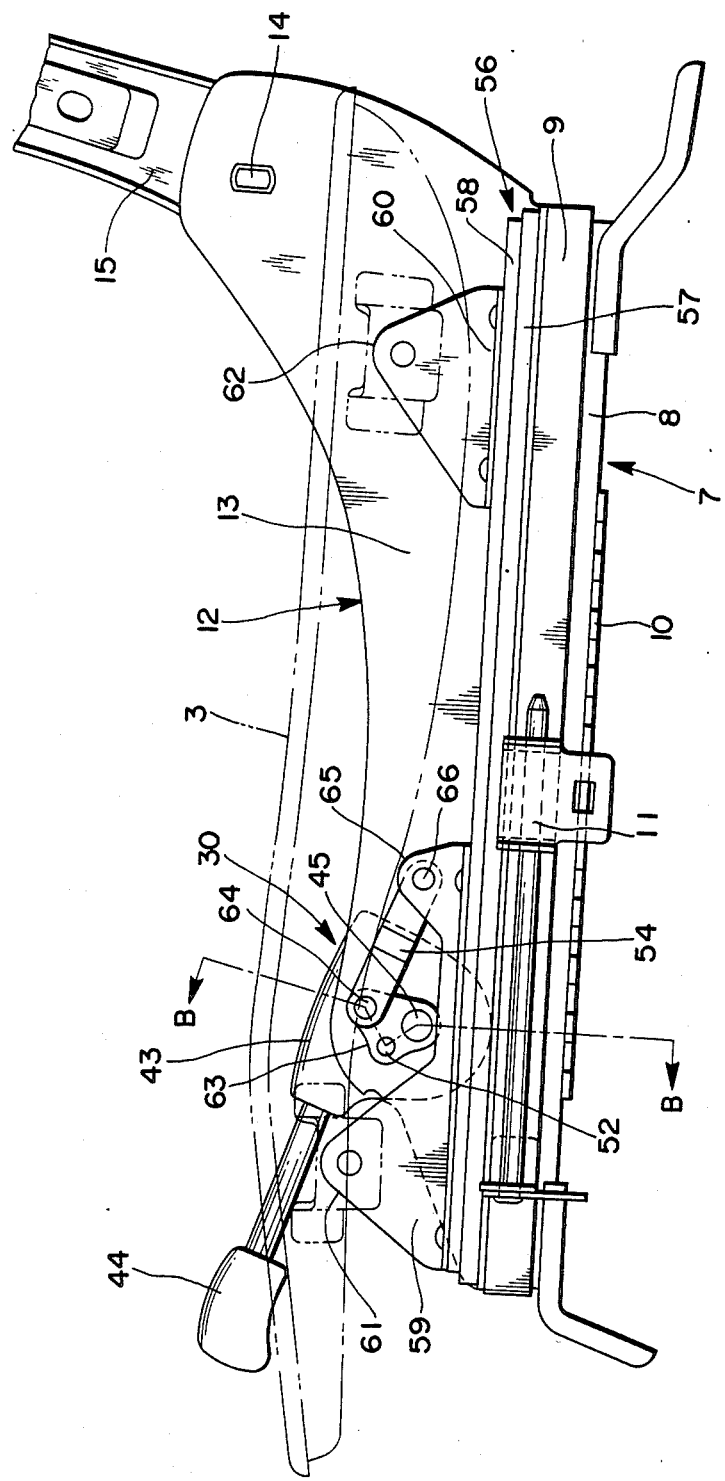
FIG. 5 is similar to FIG. 2, but showing another embodiment of the invention.
Figure 6:
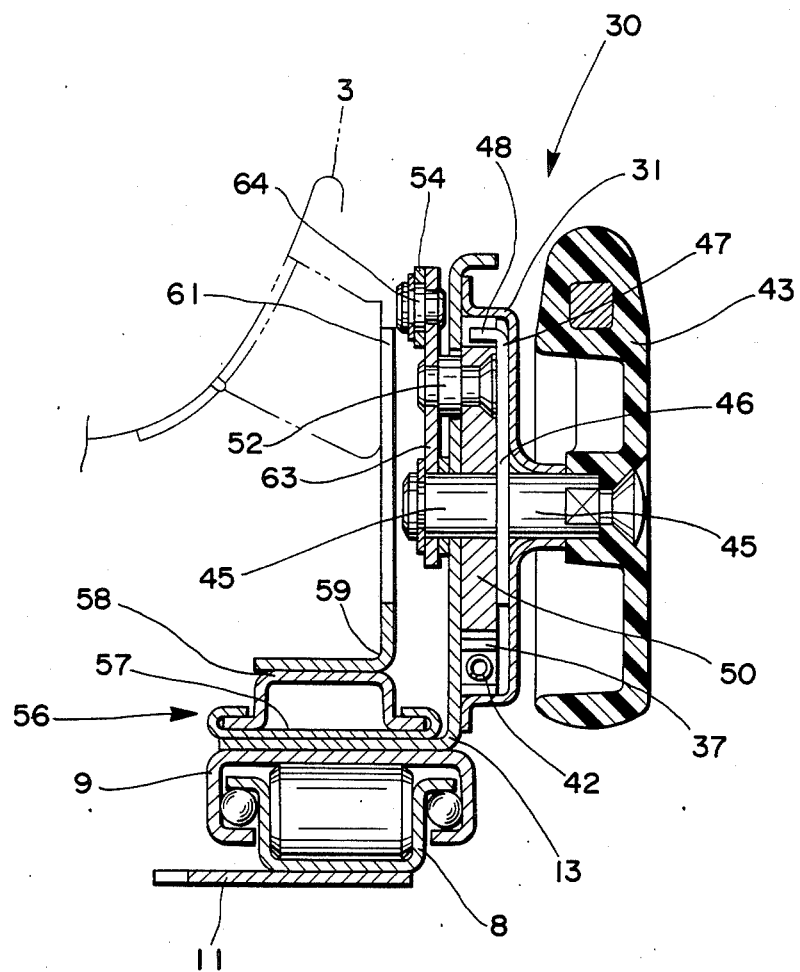
FIG. 6 is a cross-sectional view taken along the line B—B of FIG. 5.
Figure 7:
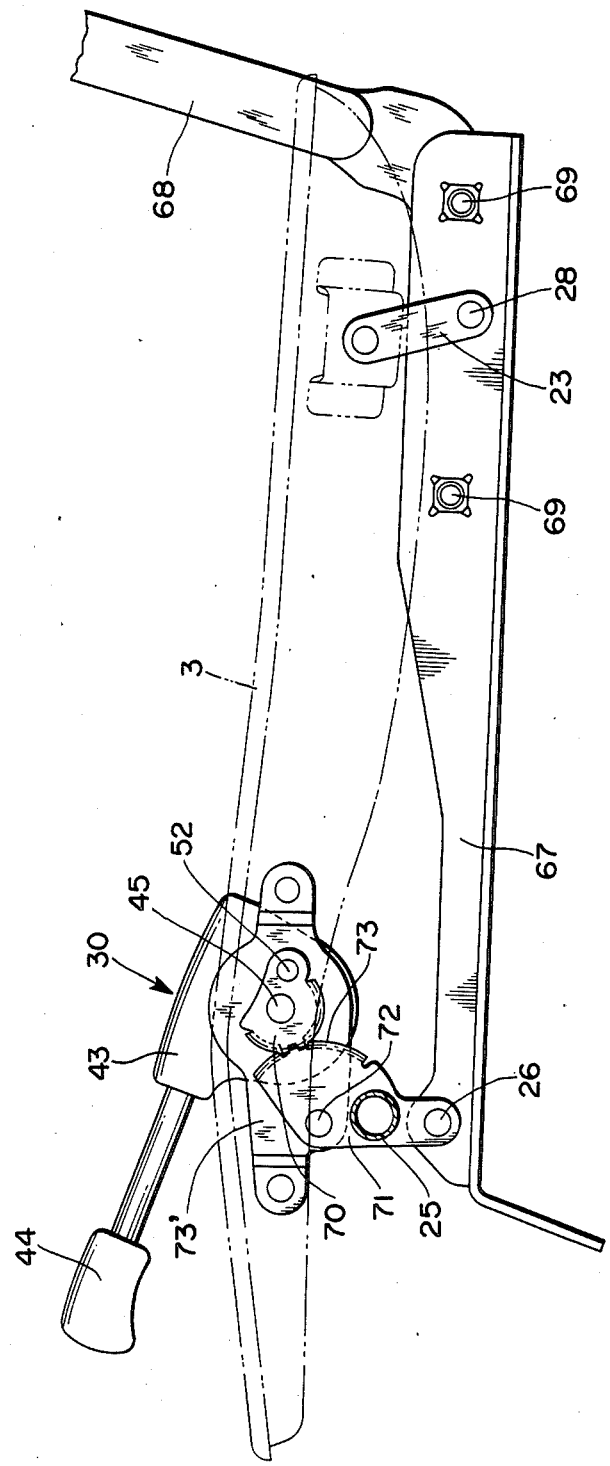
FIG. 7 is a side view of a third embodiment of the invention.

Referring now to another embodiment of the invention with reference to the drawings of FIGS. 5 and 6, the same components or structures shown in the previous embodiment have the same reference numerals. In this embodiment, a second slide mechanism 56 is provided on the seat reclining adjuster 12. The mechanism 56 includes second lower rails 57 and second upper rails 58. The lower rails 57 are secured to the upper rails 9 of the seat slide adjuster 7 and the second upper rails 58 are slidably engageable with the second lower rails 57. A front and a rear bracket 59, 60 are secured to the second upper rails 58 at its front and back portion, respectively. The brackets 59, 60 have upward projections 61, 62, respectively which support thereon the seat cushion 1 through the pan 3. A plate 63 pivoted to the shaft 45 of the clutch mechanism 30 at its lower end, is secured to the pin 52 of the disc 50, and has a shaft 64 at its upper end thereof. One end of the connecting link 54 is pivoted to the pin 64 and the other end thereof is pivoted to a pin 66 provided on the second projection 65 of the bracket 59. Next to FIG. 7, which illustrates a third embodiment of the invention. In this embodiment, instead of using seat slide adjuster and seat reclining adjuster, a frame 67 is provided on the vehicle floor and a seat back frame 68 is screwed to the frame 67 by the screws 69. A base plate 73' for the clutch mechanism 30 is secured to the pan 3. Numeral 70 indicates a gear supported by the shaft 45 and is secured to the pin 52 for unitary movement with the disc 50. Numeral 71 is another link member pivoted to the base plate 73' by a pin 72 and having a gear 73 thereon for engagement with the gear 70. The link member 71 is pivoted to the frame at its the other end. The operation of the second embodiment (FIGS. 5 and 6) is substantially the same as the first embodiment. Essentially the only difference is that instead of using links 21-24, the second slide mechanism 56 is used for moving the seat cushion 1 forwardly and backwardly. The operation of the third embodiment (FIG. 7) is also very similar to that in the first embodiment. In the third embodiment, the clutch mechanism 30 is provided on the cushion pan 3 instead of providing on the seat reclining adjuster 12, no seat slide adjuster or seat reclining adjuster have been provided, and the rotational movement from the operation lever 43 is directly transmitted to the link 71 by the gear drive mechanism (gears 70 and 73). The rest are substantially same to that disclosed in FIGS. 1-4.

The invention has thus been shown and described with reference to the specific embodiments, however, it should be noted that the invention is in no way limited to the details of the illustrated structures but changes and modifications may be made without departing from the scope of the appended claims.

What is claimed is:

1. A vehicle seat assembly, comprising:
    bracket means mounted along a vehicle floor for slidably supporting the vehicle seat;
    a backrest pivotally attached to a rearward portion of said bracket means;
    a seat frame pivotally mounted on said bracket means, said seat frame having a rearward section substantially adjacent said backrest and a forward section spaced forward of said backrest;
    pivot means connected to said bracket means and said seat frame for pivoting said seat frame backward and forward relative to said backrest, said pivot means including link members pivotally attached between said bracket means and said seat frame;
    manually-actuated clutch means connected to one of said link members for controlling the position of said pivot means, said clutch means including:
        shaft means rotatably mounted on said bracket means;
        an operating lever fixedly mounted on said shaft means;
        an eccentricity mounted disc plate rotatably supported on said shaft means;
        locking means for engaging said disc plate when said operating lever is released to lock said disc plate; and
        link means connected to said disc plate and said one of said link members for spacing said forward section of said seat frame a desired amount from said backrest in response to rotation of said operating lever, said link means including a pin eccentrically mounted on said disc plate and a connecting link, said connecting link being pivotally connected at one end to said pin and pivotally attached at an opposite end to said one of said link members.

2. The vehicle seat assembly defined in claim 1, wherein said clutch means further includes:
    a hinge plate secured to said bracket means;
    a case mounted on said hinge plate, said disc plate being rotatably positioned within said case;
    said locking means having a pair of locking plates disposed within said case and slidably mounted along a periphery of said disc plate; and
    a projection extending from said disc plate between said pair of locking plates.

3. The vehicle seat assembly defined in claim 2, wherein said clutch means includes a release lever secured to said shaft means, said release lever having engagement means for positioning one of said pair of locking plates into engagement with said projection to rotate said disc plate, thereby repositioning said connecting link to move said seat frame.

4. The vehicle seat assembly defined in claim 3, wherein said clutch means includes biasing means extending between said pair of locking plates for forcing said pair of locking plates into engagement with the periphery of said disc plate to stop the rotation of said disc plate.

5. The vehicle seat assembly defined in claim 4, wherein said bracket means includes an upper rail and a lower rail, said upper rail being slidably mounted on said lower rail, and wherein said backrest is mounted on said upper rail.

6. The vehicle seat assembly defined in claim 5, wherein said bracket means includes a latch plate mounted on said lower rail and a stopper mounted on said upper rails for releasably engaging said latch plate.

7. The vehicle seat assembly defined in claim 2, wherein said hinge plate includes a guide groove for slidably receiving said pin during rotation of said disc plate.

8. The vehicle seat assembly defined in claim 7, wherein said pivot means includes at least one transverse pipe extending between a pair of said link members supporting opposite sides of said seat frame, and wherein said transverse pipe moves backward and forward together with said link members.

* * * * *